United States Patent Office 2,891,788
Patented June 23, 1959

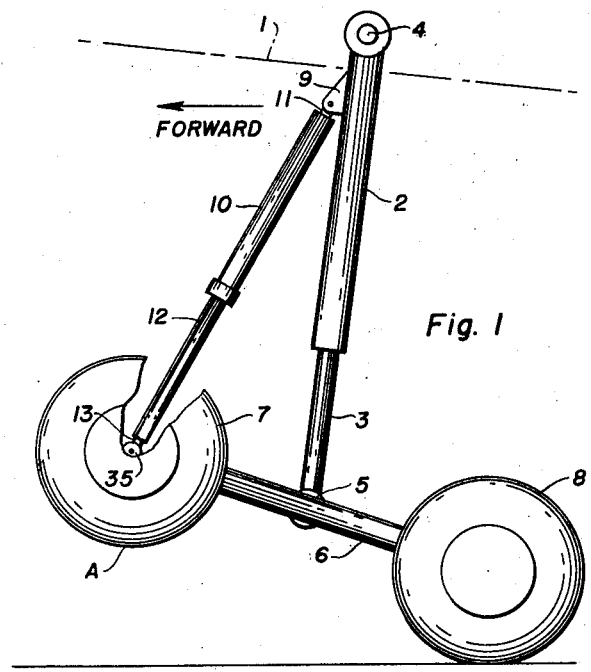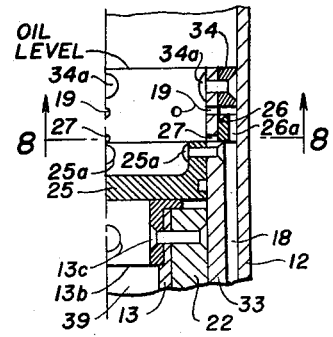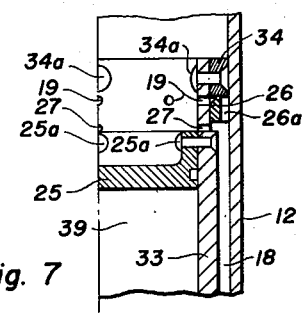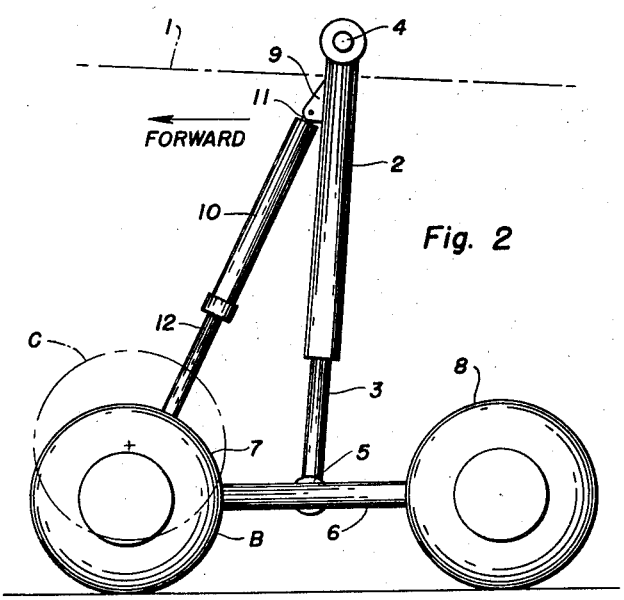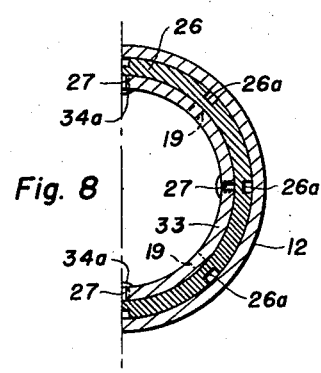

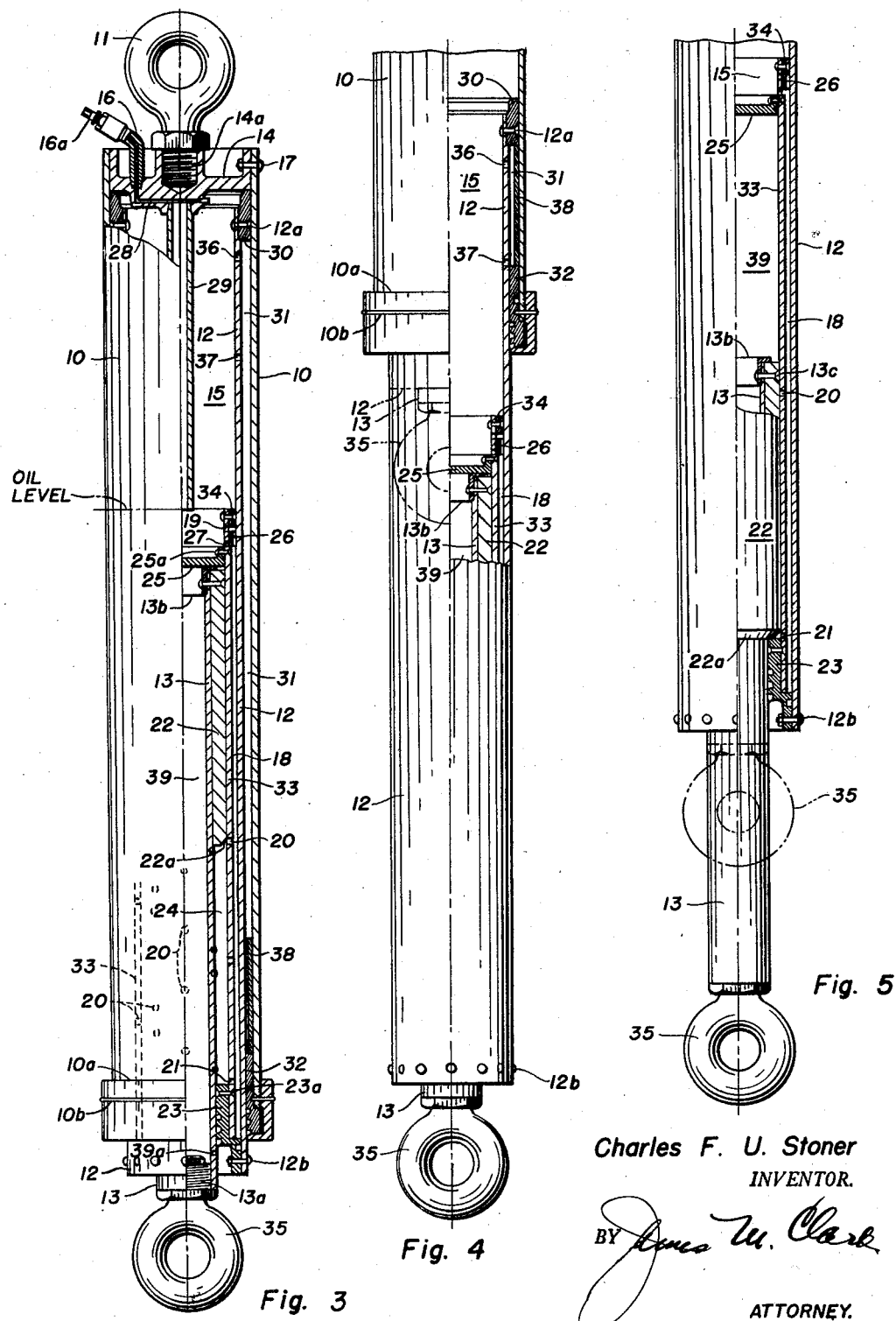

2,891,788

AIRCRAFT LANDING GEAR-DOUBLE ACTING SHOCK STRUT

Charles F. U. Stoner, Waynesboro, Pa., assignor to Fairchild Engine and Airplane Corporation, a corporation of Maryland Application April 15, 1954, Serial No. 423,351

8 Claims. (Cl. 267—64)

The present invention relates to landing gears for aircraft and the like and more particularly to improvements in the shock-absorbing strut components of such landing gears.

The present invention is directed to an improved shock-absorbing strut and more particularly to such devices wherein a double-acting shock-absorber with self-centering means is provided in a single unit or component. The improved shock-absorbing device is particularly applicable to the tandem wheel landing gears of relatively large aircraft wherein the landing gear or chassis is capable of being retracted into the aircraft structure.

In a tandem wheel landing gear, such as used on large aircraft, it is desirable that the rear wheel contact the ground initially and be brought up to rotational speed prior to the forward wheel making ground contact and subsequently being brought up to speed. The simultaneous contact of both wheels of the truck or landing gear unit imposes stresses on the landing gear structure which can only be compensated for in the design of the structure with an undesirable penalty in the form of an increase in weight. A further important reason for having the rear wheel of the truck contact the ground first is that in such condition the aircraft is at a higher angle of attack than in the level landing condition which increases the lift coefficient to reduce the landing speed and the subsequent landing roll.

Another problem in the design of tandem wheel landing gears is the absorption of the torque forces set up when the brakes are applied after the aircraft becomes airborne. This happens when the aircraft leaves the ground and the brakes are applied to stop the wheels from rotating before the landing gear is retracted. When the brakes are applied, the inertia forces form a couple tending to swing the bogie frame forward about its pivot mounting on the main landing gear strut. If the brakes are applied during retraction, these forces are frequently so great as to tear the landing gear structure from the aircraft. While the aircraft cockpit can be placarded to warn the pilot to avoid braking the wheels during retraction, this alone is insufficient because of the human element, and without some shock-absorbing means such as is provided by the present improved landing gear, it is difficult to prevent accidental damage. The present improvement not only provides this safety feature, but also, because of its self-centering feature, will condition or pre-position the landing gear for its proper retraction within the aircraft. Heretofore fluid shock-absorbing units or oleo shock struts for aircraft have for the most part been considerably greater in overall axial length than the length of the stroke and in many instances have been in the order of the ratio of 3:1, being the ratio of the overall length to the length of its stroke. The present improved shock-absorbing unit is a vast improvement in this respect in that this ratio has been reduced to slightly greater than 1:1.

It is, accordingly, a major object of the present invention to provide a double-acting fluid shock-absorber having automatic self-centering means and requiring a predetermined force to move the device in either direction from the centered position. It is also an object to provide an improved shock-absorbing strut having a minimum ratio of overall length to stroke. A further object resides in the provision of an oleo unit which will absorb energy on the extension cycle and store energy on the compression cycle under these opposite forces or loads to which the landing gear may be subjected, and will automatically be returned by its stored energy to its central condition when the disturbing forces have been removed. It is a still further object to provide an improved relationship of the components of a retractable tandem type aircraft landing gear for accomplishing these objectives.

Other objects and advantages of the present invention will occur to those skilled in the art after reading the following description taken in conjunction with the accompanying drawings, forming a part hereof in which:

Fig. 1 shows a retractable tandem type landing gear to which an improved form of the present shock absorbing device has been applied, with the landing gear shown at the point of touchdown position;

Fig. 2 is a similar view of the same with both wheels in contact with the ground;

Fig. 3 is a detail view, partially in cross-section, of the improved shock-absorbing device in its fully compressed state;

Fig. 4 is a similar view of the lower end of the device in its centered or neutral condition;

Fig. 5 is a similar view showing the lower end of the device in its fully extended condition;

Fig. 6 shows, to an enlarged scale, the junction of the intermediate piston-cylinder member and the lower piston member in the neutral or centered condition of the strut as indicated in Fig. 4;

Fig. 7 is a similar sectional view of the same portion of the intermediate piston-cylinder member but with the lower piston member displaced therefrom in an extended position approaching that of Fig. 5; and Fig. 8 is a cross-sectional view as taken along the lines 8—8 of Fig. 6.

Referring now to Figs. 1 and 2 the broken line designated by the numeral 1 represents the aircraft, being either the underportion of the fuselage or one of its wings, within which the main shock-absorbing strut comprising the cylinder 2 and the piston 3 is pivotally mounted at 4 for retraction and extension to the operative position shown. Mechanism for the retraction of such landing gears is well known and any suitable means may be utilized for moving the disclosed landing gear into the retracted position. A pivotal connection is provided at 5 at the lower end of the shock-absorber piston 3 for the bogie frame or truck 6. At the forward end of the truck 6, there is rotatably mounted the front wheel, or wheels 7 and a similar wheel, or wheels 8, are rotatably mounted at the aft terminal of the truck 6. The rocking of the wheels 7 and 8 and the truck 6 about the transverse axis of the pivot mounting 5 is controlled and resiliently opposed by the improved double-acting shock-absorbing strut 10, comprising an essential component of the present improvement.

Adjacent the upper terminal of the main shock-absorbing cylinder 2, there is provided the forwardly facing apertured lug 9 to which the upper eye-bolt 11 of the improved secondary strut 10 is pivotally mounted. The front strut comprises essentially an upper cylinder portion 10 carrying the eye-bolt 11, an intermediate piston-cylinder portion 12 and a lower piston portion 13. The latter is pivotally mounted by means of the eye-bolt fitting 35 to the axle or axis of rotation of the front wheels 7 at the forward end of the truck element 6. In the position of the wheels 7 and 8, as shown in Fig. 1, the aircraft is landing at the point of touch-down, the rear wheels 8 not having been moved upwardly to any extent as yet either by rotation of the frame 6 about the transverse axis of the pivot 5, or by the telescoping of the piston portion 3 within the cylinder portion 2 of the main shock absorbing unit. Accordingly, in the position of the front wheels, as indicated at A, the lower piston assembly 13 of the secondary strut is shown in its centered position fully telescoped within the intermediate assembly 12 which in turn is in its fully extended position with respect to the upper cylinder 10.

Referring now to Fig. 2, the tandem type landing gear arrangement of Fig. 1 is shown with the airplane 1 at rest on the ground with each set of wheels 7 and 8 in contact with the ground and absorbing its respective share of the load. In the attitude shown in Fig. 2, the bogie frame 6 is disposed substantially horizontally with the main piston element 3 telescoped to some extent within the cylinder component 2 of the main shock-absorber and the forward strut 10 disposed in an extended condition. This position B of the forward set of wheels 7 in Fig. 2 is shown in the taxiing or at rest condition upon the ground, and the position C, indicated by the construction lines in this figure shows the partially compressed condition of the forward shock-absorbing strut 10. This condition might occur during taxiing whenever the front set of wheels strikes some obstruction upon the field or runway, or from other causes.

Referring now more particularly to Figs. 3, 4 and 5, the improved forward or secondary shock strut comprises, as stated above, the three major telescoping units, namely, the upper cylinder unit 10, the intermediate piston-cylinder unit 12, slidable within the upper cylinder 10, and the lower piston unit 13 which is slidable within the intermediate assembly 12. The upper end of the upper cylinder 10 is closed by the plug 14 which has a threaded socket or opening 14a to receive the threaded eye-bolt 11 which is used to pivotally mount the forward shock absorbing strut to the lug 9 of the main shock absorber 2. A fitting 16 is attached to the plug 14 for introducing fluids through the passage 28 into the interior of the upper cylinder 12 by way of the centrally disposed stand-pipe 29 open at its lower end to the chamber 15. The cylindrical plug 14 has a flange which is suitably apertured to receive the peripherally disposed bolts 17 by means of which the plug is attached to the interior of the external shell or wall of the cylinder 10. The intermediate piston-cylinder unit 12 is spaced apart from the upper cylinder 10 by the intermediate spacer 30 attached to the cylinder 12 at its upper end as by the countersunk head rivets 12a, and by a spacer 32 attached to the cylinder 10 at its lower end to form the air space 31, the purpose of which will be explained more fully below. The lower end of the cylinder 10 is threaded and provided with a retaining collar 10a locked in place by the lock ring 10b. The collar 10 also serves to hold the spacer 32 in place.

The intermediate piston-cylinder assembly 12 comprises for substantially half its axial length a double-wall structure formed by an inner cylinder 33, an upper spacer 34 and a lower spacer 23. A transverse diaphragm 25 is attached at the upper end of the inner cylinder 33 by the rivets 25a, as shown in greater detail in Figs. 6 to 8, inclusive. This diaphragm serves to separate the interior chamber 15 of the intermediate assembly 12 (including the upper air space 31) from the lower oil space 18 and the chamber 39 of the lower piston assembly 13. Within this lower space, the lower piston assembly 13 is adapted to slide or reciprocate, being spaced apart from the inner cylinder 33 by the upper spacer 22 and the lower spacer 23. The dead air space 39 is vented to the atmosphere through the openings 39a which prevent the development of pressure or partial vacuum by the residual air which would affect movement of the piston 13.

It will be noted that the lower spacer 23 is offset in cross-section and serves both to define the space 18 between the cylindrical walls 12 and 33, as well as to additionally form the annular chamber or space 24 between the same cylindrical wall 33 and the outer cylindrical surface of the piston assembly 13. This offset lower spacer 23 is attached to the lower end of the tube 12 by the bolts 12b and to the tube 33 by the countersunk rivets 23a. The lower piston assembly 13 is similarly provided with a threaded eye-bolt fitting 35, threadedly engaging the socket 13a for suitable attachment to the forward axle or pivotal mounting of the front set of landing wheels 7. The outer cylinder 12 of the intermediate piston-cylinder assembly forms, in cooperation with the outer cylinder 10, the intermediate annular space 31 which is placed in communication with the upper chamber 15 by means of the upper and lower series of openings 36 and 37, respectively. The lower end of this annular space 31 contains an annular ring 38 which serves as a spacer to limit the telescoping extension or elongation of the piston-cylinder assembly 12 with respect to the upper cylinder 10 when the spacer 30 bottoms upon the top edge of the spacer tube 38.

Hydraulic shock-absorber oil is poured into the interior of the piston-cylinder assembly 12 through the air valve 16a, the filler fitting 16, the passageway 28 and down through the standpipe 29 into the space 15 above the transverse diaphragm 25. This fluid passes outwardly through the series of orifices 19 beneath the annular spacer 34 and down into the annular space 18 between the cylindrical tubes 33 and 12. From there it passes inwardly through the orifices 20 and 21 in the inner cylinder 33 to the space 24 formed by the cylinder 33, the piston assembly 13 and the two end spacers 22 and 23. With the shock-absorbing strut disposed in the vertical or upright position shown in Fig. 3, the oil or fluid is added until the level thereof reaches the lower end of the stand-pipe 29 as indicated by the oil level line on this figure.

Compressed air is next added to the interior space 15 above the oil level, entering through the air valve 16a after it has been installed in the fitting 16, until a predetermined internal pressure has been reached, whereupon the valve 16a is sealed off. This compressed air fills the space 15 above the oil as well as the space 31 formed by the upper cylinder 10 and the intermediate piston-cylinder assembly 12 by passing through the two above-mentioned orifices 36 and 37 in the wall of the intermediate piston-cylinder 12. As the air pressure builds up, the oil is also compressed and acting substantially as a piston forces the cylinder assemblies 12 and 10 to slide apart with respect to each other until they extend to the position shown in Fig. 4. For convenience this has been termed the neutral or centered position, as indicated by the attitude of the front wheels 7 shown at A in Fig. 1. The extension of the piston-cylinder assembly 12 with respect to the upper cylinder 10 is limited by the spacer tube 38 when it seats against the spacer 30 and the spacer tube 32. It will now be seen that the shock strut will resiliently oppose and absorb compression forces by compression of the entrapped air with the oil or fluid serving as a piston. Such force, however, must be greater than the predetermined air pressure initially installed within the system and as this disturbing force falls below the air pressure force, the unit centers itself again and returns to the normal position shown in Fig. 4.

The purpose of the compressed air space 31 between the upper cylinder 10 and the intermediate assembly 12 is two-fold. The main or primary reason for this air space is the provision of a greater compression stroke per unit force since this volume increases as the volume of the space above the oil level decreases, which allows some of the air to by-pass thereto and the unit to telescope a greater distance than would be possible if it were necessary to compress the air in only the space 15 within the confines of cylinders 10 and 12 above the oil. The second and further purpose is to allow the use of commercial tolerance tubes or tubing for the cylinders 10 and 12 to avoid the expensive machining of the contacting surfaces which would be necessary if the spacers 30 and 32 were not used.

In Fig. 5, the strut has been subjected to a tension force causing the unit to be extended or elongated to its full length. As the tension force is applied, such as indicated by the wheel position B in Fig. 2, the spacer 22 in being drawn down forces the oil in the space 24 outwardly through the orifices 20 and 21 into the space 18, the orifice 20 serving only at the beginning of the movement of the piston 13 and being immediately closed off as the piston is initially moved. The oil pressure which is developed within the space 18 moves the shuttle valve 26 upwardly to close off the orifice 19 and to uncover the orifice 27 which serves to meter the flow of oil. The lower end of the spacer 22 is chamfered as shown at 22a to prevent its closing off the lower orifice 21. This shuttle valve 26 is shown to better advantage in the enlarged detail section shown in Figs. 6, 7 and 8, being in its lower position in Fig. 6 in which the orifice 19 is open, and being shown in its upper or actuated position in Fig. 7 in which the orifices 19 are closed and the metering orifices 27 are opened. The shuttle valve 26 is shown as having a plurality of orifices or ports 26a disposed around its periphery through which the oil may flow, eight such orifices being illustrated in the drawings, although obviously a greater or lesser number may be provided. Inasmuch as the cross-sectional area of the shuttle valve is greater than the total orifice area, the valve will slide upwardly under the oil pressure in the direction of the flow. As shown in Figs. 6 and 7, the upper end of the piston 13 terminates in the flanged end ring 13b which bears against the diaphragm 25 in the centered condition. The three elements 13, 22 and 13b are fastened together by the rivets 13c. The spacer 34 is similarly fastened to the upper end of the shell 33 by the rivets 34a.

It might be mentioned at this point that under conditions where a variable resistance to the tensioning force is desired, a plurality of metering orifices may be placed in the cylinder wall 33 instead of the orifices disposed as at 20 and 21, in order to provide variable metering of the oil. These orifices for example may be arranged spirally around the cylinder 33 in which case succeeding orifices will be closed by the spacer 22 as the piston assembly 13 is extended and the resistance to the extension increases in proportion as the oil flow is decreased. Conversely, as the unit is compressed from its fully extended position, the orifices are uncovered successively one by one and the resistance decreases until the centered position is reached at which point the end of the spacer 22 with its attached end ring 13b bottoms against the diaphragm 25 and prevents further movement of the lower piston assembly 13 in that direction. Further compression of the shock strut is, of course, resiliently resisted by compression of the air above the oil level which stores energy and therefore will immediately return the unit to its centered position when the disturbing force or load is released or removed.

As indicated above, Fig. 1 illustrates the improved double-acting shock strut of the present invention as applied to an aircraft landing gear of the tandem wheel type at the point of touch-down in the landing attitude with the rear wheel unit 8 just contacting the ground. As the rear wheel unit 8 begins to spin up and the aircraft slows down, its weight is gradually taken up by the landing gear and the shock unit allows the front wheel to descend gradually to the ground as shown in Fig. 2. The improved front unit 10—12—13 prevents the front wheel or wheels 7 from abruptly contacting the ground through the metering of the oil and the resilient opposition to the extension of the strut unit. As the aircraft rolls over the ground, the shock of the irregularities or obstructions encountered by the front wheel unit 7 will be absorbed by compression of the unit 10—12—13 to a compressed condition as indicated at C in Fig. 2 by the construction lines.

It will, accordingly, be noted that an improved front shock strut is provided which automatically returns to its normal or centered position from which it resiliently opposes external forces tending either to extend or compress the strut, or by other forces such as may occur by the braking of the landing gear wheels following the take-off run to stop the spinning of the wheels in order to retract the landing gear assembly. As indicated above, when the brakes are applied in this condition, the inertia forces form a couple tending to swing the bogie frame forward about its pivot point 5 on the landing gear. These inertia forces are frequently of such magnitude that landing gear structures have been caused to fail and be torn from the aircraft when the brakes were applied during retraction. Inasmuch as the improved shock strut unit 10—12—13 resiliently opposes such forces, the landing gear with which it is equipped may be braked under any conditions without fear of failure or damage to the landing gear or adjacent structure.

Other forms and modifications of the present invention, both with respect to its general arrangement and the details of its respective parts, which may occur to those skilled in the art following the reading of the present disclosure, are intended to come within the scope and spirit of this invention as more particularly defined in the appended claims.

I claim:

1. A double acting shock absorbing strut comprising a cylinder having a hollow interior, a first piston slidable in said cylinder, said first piston having a piston head and inner and outer substantially concentric tubular walls defining a first chamber between them and a cylinder space inside said inner wall, a second piston having a head slidable in said inner wall and a piston rod spaced from said inner wall and forming a second closed chamber between said inner wall and said piston rod, first ports in said first piston adjacent to its head connecting said interior of said cylinder and said first chamber, a row of second ports extending lengthwise of said inner wall connecting said first chamber and said second chamber and covered and uncovered by said second piston as the latter slides in said cylinder space, and means for introducing a fluid under pressure to the interior of said cylinder and said first and second chambers to project said first piston in said cylinder and retract said second piston in said cylinder space.

2. The strut set forth in claim 1 comprising a shuttle valve in said first piston and slidable lengthwise thereof to cover and uncover said first ports selectively.

3. A double-acting shock-absorbing strut comprising a main outer cylinder element having a gas-receiving space therein, an intermediate piston-cylinder element telescopically mounted within said main cylinder element, said intermediate element comprising inner and outer substantially concentric spaced cylinders defining a first annular space between them and a cylinder space within the inner cylinder, an inner piston element telescopically mounted within said inner cylinder and having a portion spaced from said inner cylinder forming a second annular space, a passage connecting said first and second annular spaces, a passage connecting said first annular space with said gas-receiving space, fluid means including oil interposed between said intermediate and piston elements in said first and second annular spaces for opposing telescopic extension of said piston element with respect to said piston-cylinder element, said fluid means including compressed gas in said gas-receiving space and applying pressure to said oil in said first annular space of said intermediate piston-cylinder element and said outer cylinder element for resiliently opposing telescopic compression of said intermediate element with respect to said outer element.

4. A double-acting shock-absorbing strut of the type called for by claim 3 comprising metering orifice means in said intermediate piston-cylinder element disposed between said first and second annular spaces whereby extension of said piston element with respect to said intermediate piston-cylinder element causing displacement of said fluid means from said second annular space into said first annular space is opposed by the metering of said fluid means through said orifice means.

5. A shock-absorbing strut comprising a main upper outer cylinder, an intermediate piston-cylinder element reciprocably mounted within said main outer cylinder, said intermediate element having a lower double-wall defining a fluid space between the double walls and an inner cylinder space, a piston element reciprocably mounted in said cylinder space within the lower portion of said intermediate element, orifices connecting said fluid space with said inner cylinder space for flow of fluid between said spaces in response to movement of said piston, a transverse diaphragm fixed to said intermediate element and defining an upper chamber between said main cylinder and said intermediate element, orifices formed with said intermediate element adjacent to said diaphragm connecting said upper fluid chamber with said fluid space in said double-wall portion, and shuttle valve means operatively carried by said intermediate element arranged for metering fluid flow through said orifices between said double-wall fluid space and said upper fluid chamber upon relative reciprocal movement of said piston and intermediate elements.

6. A double-acting shock-absorbing strut comprising a main outer cylinder having a hollow interior, an intermediate piston-cylinder element having upper and lower portions reciprocably mounted within said main outer cylinder, said intermediate element having a double-wall construction in its lower portion defining a first fluid space between the double walls, a piston element reciprocably mounted within the lower portion of said intermediate element and having a portion spaced from said intermediate element to form a second fluid space, restricted fluid passages in said intermediate element interconnecting the said fluid spaces and connecting said first fluid space with the interior of said outer cylinder, and fluid means within said fluid spaces and in said outer cylinder interposed between said elements for resiliently opposing relative reciprocal extension of said piston element with respect to said intermediate element and relative reciprocal compression of said intermediate element with respect to said cylinder.

7. A double-acting shock-absorbing strut comprising a main outer cylinder element having a hollow interior, an intermediate piston-cylinder element having upper and lower portions reciprocably mounted within said main outer cylinder element, said intermediate element having a double-wall construction in its lower portion defining a fluid space between the double walls of said element and an inner cylinder space, a piston element reciprocably mounted in said cylinder space within the lower portion of said intermediate element, a transverse diaphragm dividing said intermediate element into upper and lower fluid chambers, said piston element having a portion spaced from said intermediate element and forming therebetween a second fluid space below said transverse diaphragm, orifices in said piston-cylinder element providing communication between said fluid spaces and said upper fluid chamber, fluid under pressure in said fluid spaces and said upper fluid chamber normally urging said elements into a normal neutral relationship, and shuttle valve means arranged for metering fluid flow through said orifices between said fluid spaces and said upper fluid chamber whereby disturbance of any of said elements from said neutral relationship is resiliently opposed by said pressure fluid.

8. A shock-absorbing strut comprising a main outer cylinder element, an intermediate double-wall piston-cylinder element reciprocably mounted within said main cylinder element, said intermediate element having a first fluid space between said double walls, an inner piston element reciprocably mounted within said piston-cylinder element and forming therewith a second fluid space, orifice means connecting said first annular space and the interior of said main cylinder, a metering shuttle valve for covering said orifice means to oppose extension of said inner element with respect to said main cylinder element, and spirally arranged orifices spaced lengthwise of said intermediate element and connecting said first and second fluid spaces, said spirally arranged orifices being successively closed by said piston as it is extended.

References Cited in the file of this patent

UNITED STATES PATENTS

| | | |
|---|---|---|
| 1,780,659 | Wallace | Nov. 4, 1930 |
| 1,918,426 | Radnor | July 18, 1933 |
| 2,106,289 | Wallace | Jan. 25, 1938 |
| 2,333,096 | Dowty | Nov. 2, 1943 |
| 2,364,865 | Mattingly | Dec. 12, 1944 |
| 2,436,573 | Heynes | Feb. 24, 1948 |
| 2,490,485 | Spaeth | Dec. 6, 1949 |
| 2,579,180 | Eldred | Dec. 18, 1951 |
| 2,627,405 | Hlatko et al. | Feb. 3, 1953 |
| 2,670,160 | Neilson et al. | Feb. 23, 1954 |
| 2,679,827 | Perdue | June 1, 1954 |

FOREIGN PATENTS

| | | |
|---|---|---|
| 982,548 | France | Jan. 31, 1951 |
| 650,547 | Great Britain | Feb. 28, 1951 |
| 690,111 | Great Britain | Apr. 15, 1953 |
| 906,177 | Germany | Mar. 11, 1954 |